G. M. & C. C. RICHARDSON.

Assignors to W. H. Field.

HORSE HAY-RAKES.

No. 7,836. Reissued Aug. 7, 1877.

Witnesses;
Grenville Lewis
M. Chunk

Inventor
Geo: M. Richardson
Chas: C. Richardson
By Hill, Ellsworth & Spear
Their Attys.

N. PETERS, PHOTO-LITHOGRAPHER, WASHINGTON, D. C.

UNITED STATES PATENT OFFICE.

GEORGE M. RICHARDSON AND CHARLES C. RICHARDSON, OF DANA, MASS., ASSIGNORS TO WILLIAM H. FIELD, OF PORT CHESTER, NEW YORK.

IMPROVEMENT IN HORSE HAY-RAKES.

Specification forming part of Letters Patent No. 89,169, dated April 20, 1869; Reissue No. 7,836, dated August 7, 1877; application filed November 14, 1876.

*To all whom it may concern:*

Be it known that we, GEORGE M. RICHARDSON and CHARLES C. RICHARDSON, of Dana, in the county of Worcester and State of Massachusetts, have invented a new and useful Improvement in that class of Wheeled Hay-Rakes in which, for the purpose of lifting the teeth, frictional connection is made between them and some one or more of the revolving parts.

Figure 1:
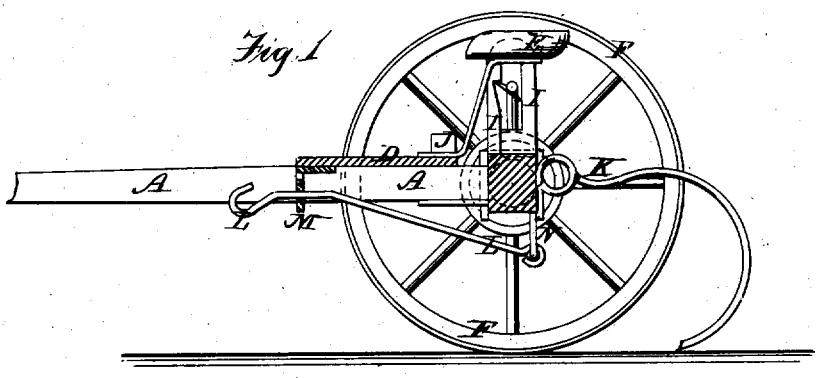
Figure 2:
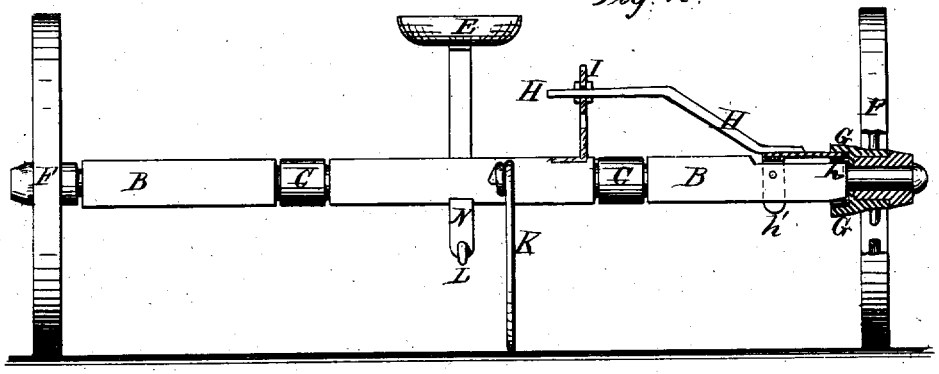

Figure 1 is a detail vertical section of our improved rake taken through the line *x x*, Fig. 2. Fig. 2 is a detail rear view of the same, parts being broken away to show the construction.

The same letters of reference indicate identical parts.

Our invention consists, first, of a flange fixed upon a revolving part of the machine, in combination with a frictional brake, which serves to lock the said revolving part to that part which carries the teeth.

It consists, further, of certain details of construction, hereinafter more fully described and specifically claimed.

A are the thills, to the rear ends of which the axle B is connected by straps C, attached to the said rear end of the thills, and passing around the said axle in grooves formed for their reception, or by an equivalent device, in such a way that the axle B may revolve, or partially revolve, on its bearings.

D is a platform, attached to the rear part of the thills A, and by which the driver's seat E is supported.

F are the wheels, which are placed and revolve upon the axle B in the ordinary manner. The inner end of the hub of one or both the wheels F is formed with a projecting band or flange, G, or has a cup-shaped recess formed in it, as shown in Fig. 2.

H is a lever, which is pivoted to the axle B by means of the ears or straps *h'* formed upon the said lever H, as shown in Fig. 2. Upon the outer end of the lever H is formed, or to it is attached, a block or shoe, *h*, fitting upon the inner or concave surface of the band or flange G, so that the said axle may be carried around by the revolution of the said wheel, the lever H and band G acting as a friction-brake. The inner end of the lever H passes through the slotted guide-arm I, and extends inward into such a position as to be readily reached and operated by the driver from his seat. The lever H is provided with a catch, which takes hold of a notch formed in the slotted arm I, to hold the block *h* in contact with the band or flange G of the wheel F.

The lower end of the guide-arm I is securely attached to the axle B, and said arm may have another notch formed in it, into which the lever H may catch to hold the block *h* away from the flange of the wheel F.

J is a stop or arm, attached to the platform D or thills A in such a position that as the axle B is revolved by the wheel F, the lever H may strike against the stop J, and be lifted out of the notch in the slotted arm I, allowing the friction-block *h* to drop away from the band of the wheel F, and allowing the rake-teeth to drop to the ground to again gather the hay.

K are the rake-teeth, which are securely attached to the rear side of the axle B, and which are formed with a coil or bend near the axle B, as shown in Figs. 1 and 2, so that they may spring or twist to pass any obstruction against which they may strike, each tooth in this respect acting independently of the others.

L is the draft-bar, which passes through a guide or support, M, attached to the forward part of the platform D, and the rear end of which is pivoted to an arm or lever, N, the upper end of which is securely attached to the axle B.

By this arrangement of the draft-bar the draft-strain is made to hold the rake-teeth down to the ground, and is also made to bring the rake-teeth down quickly when the lever H is disengaged by the stop J.

We claim as our invention—

1. In a wheeled horse hay-rake, the combination of the revolving hollow flange G with the partially-revolving rake-head and the friction-brake applied to the concave of the flange, substantially as described.

2. The combination of the band or flange G, lever H *h′ h*, and slotted arm I with each other, and with the axle B and wheel F, substantially as herein shown and described, and for the purpose set forth.

Witness our hands and seals this 24th day of April, 1876, in the matter of our application for a reissue of Letters Patent on horse hay-rakes, dated April 20, 1869.

GEORGE M. RICHARDSON. [L. S.]
CHARLES C. RICHARDSON. [L. S.]

Witnesses:

VELORCUS TAFT,
Y. B. TAFT.